(12) United States Patent
Roy et al.

(10) Patent No.: US 12,278,571 B2
(45) Date of Patent: Apr. 15, 2025

(54) DEVICE FOR CREATING A DC VOLTAGE BUS FOR A POLYPHASE ELECTRICAL SYSTEM, MOTOR VEHICLE AND RENEWABLE ENERGY GENERATOR COMPRISING SUCH A DEVICE

(71) Applicants: PSA AUTOMOBILES SA, Poissy (FR); CENTRALE SUPELEC, Gif-sur-Yvette (FR); CENTRE NATIONAL DE LA RECHERCHE SCIENTIFIQUE, Paris (FR); SAFT, Levallois Perret (FR); SORBONNE UNIVERSITE, Paris (FR); UNIVERSITE PARIS-SACLAY, Gif-sur-Yvette (FR)

(72) Inventors: Francis Roy, Les Ulis (FR); Thomas Peuchant, Le Bouscat (FR); David Herpe, Tresses (FR); Eric Laboure, Cachan (FR); Franck Castejon, Meriel (FR)

(73) Assignees: PSA Automobile SA, Poissy (FR); Centrale Supelec, Gif-sur-Yvette (FR); Centre National de la Recherche Scientifique, Paris (FR); SAFT, Levallois Perret (FR); Sorbonne Universite, Paris (FR); Universite Paris-Saclay, Gif-sur-Yvette (FR)

(*) Notice: Subject to any disclaimer, the term of this patent is extended or adjusted under 35 U.S.C. 154(b) by 0 days.

(21) Appl. No.: 18/553,807

(22) PCT Filed: Mar. 16, 2022

(86) PCT No.: PCT/FR2022/050474
§ 371 (c)(1),
(2) Date: Oct. 26, 2023

(87) PCT Pub. No.: WO2022/214745
PCT Pub. Date: Oct. 13, 2022

(65) Prior Publication Data
US 2024/0186914 A1 Jun. 6, 2024

(30) Foreign Application Priority Data
Apr. 8, 2021 (FR) .................................. 2103578

(51) Int. Cl.
*H02M 7/48* (2007.01)
(52) U.S. Cl.
CPC .............................. *H02M 7/4826* (2013.01)
(58) Field of Classification Search
CPC .... H02M 7/4826; H02M 7/4835; Y02T 10/70
(Continued)

(56) References Cited

U.S. PATENT DOCUMENTS

2013/0148397 A1* 6/2013 Schroeder ............. H02M 7/487
363/132
2013/0241472 A1 9/2013 Feuerstack et al.
(Continued)

FOREIGN PATENT DOCUMENTS

WO 2015185566 A1 12/2015

OTHER PUBLICATIONS

International Search Report for PCT/FR2022/050474 mailed Jul. 4, 2022.
Written Opinion for for PCT/FR2022/050474 mailed Jul. 4, 2022.

*Primary Examiner* — Elim Ortiz
*Assistant Examiner* — Xuan Ly
(74) *Attorney, Agent, or Firm* — Sandberg Phoenix & von Gontard, PC; Jonathan P. Soifer

(57) ABSTRACT

The invention relates to a device forming a DC voltage bus for a polyphase electrical system (M), comprising voltage legs (A1, A2, A3) each having a plurality of battery cell modules (C1, C2, C3), each module comprising a battery
(Continued)

cell or a cluster of battery cells (c1), connected to a DC-to-AC converter (DCAC); said battery cell modules (C1, C2, C3) being connected together in series via the DC-to-AC converter (DCAC); said voltage legs (A1, A2, A3) each being connected to a specific phase leg (B1, B2, B3) for said polyphase electrical system (M), at least one phase leg (B1, B2, B3) having a branch (D1, D2, D3) connected to a rectifier module (R1). The invention also relates to a motor vehicle, a renewable energy generator and a method based on such a system.

11 Claims, 4 Drawing Sheets

(58) Field of Classification Search
USPC .......................................................... 307/52
See application file for complete search history.

(56) References Cited

U.S. PATENT DOCUMENTS

| 2015/0123601 A1* | 5/2015 | Smith | H02M 7/797 |
|---|---|---|---|
| | | | 320/107 |
| 2019/0103750 A1* | 4/2019 | Kristensen | H01M 10/441 |
| 2020/0014310 A1 | 1/2020 | Helling et al. | |

* cited by examiner

[Fig.1]
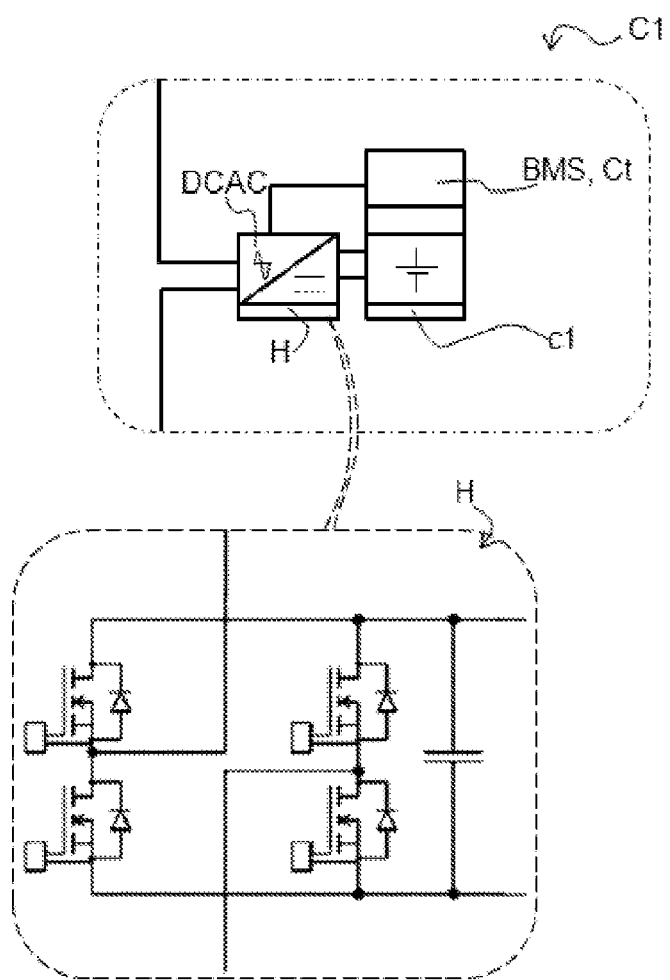

[Fig.2]
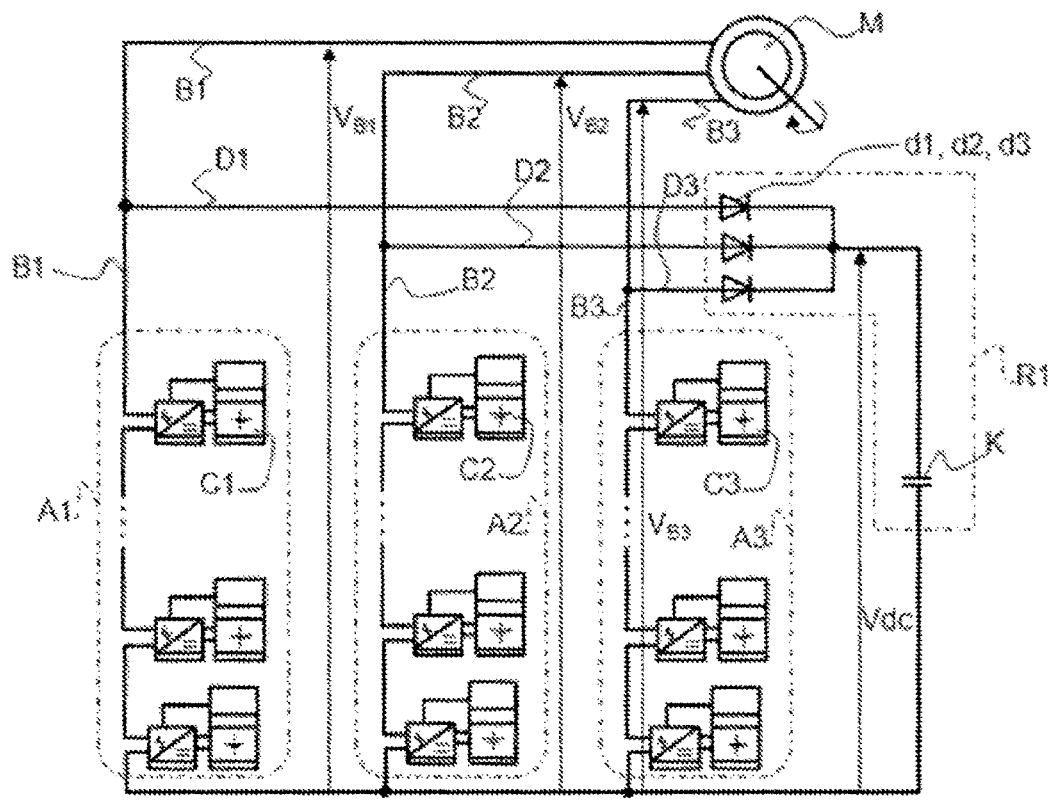
[Fig.3]
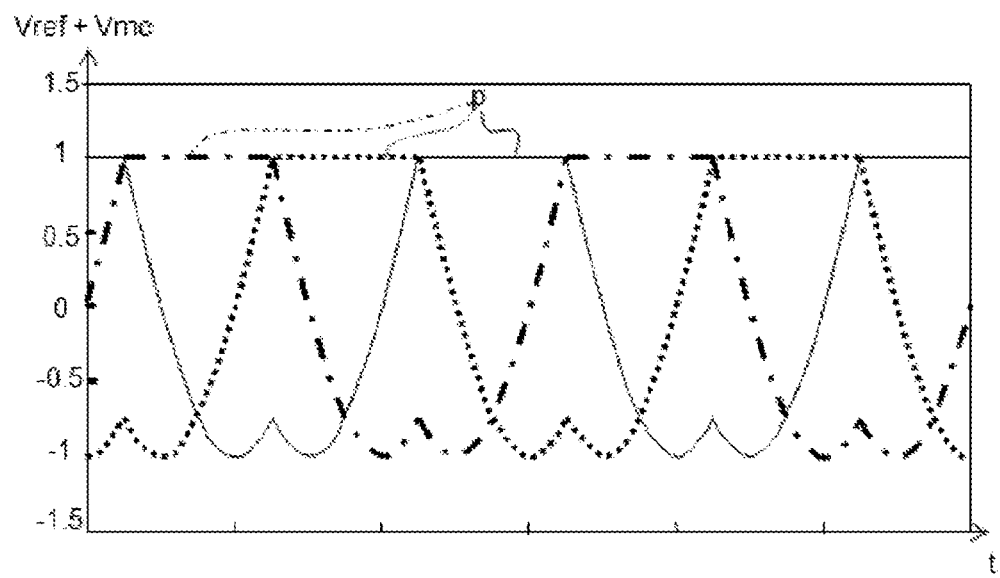

[Fig.4]
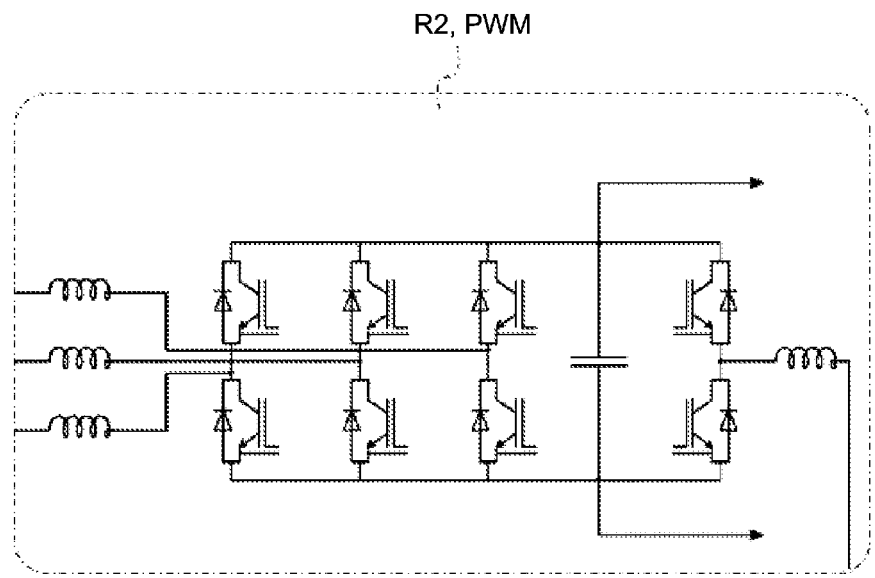
[Fig.5]
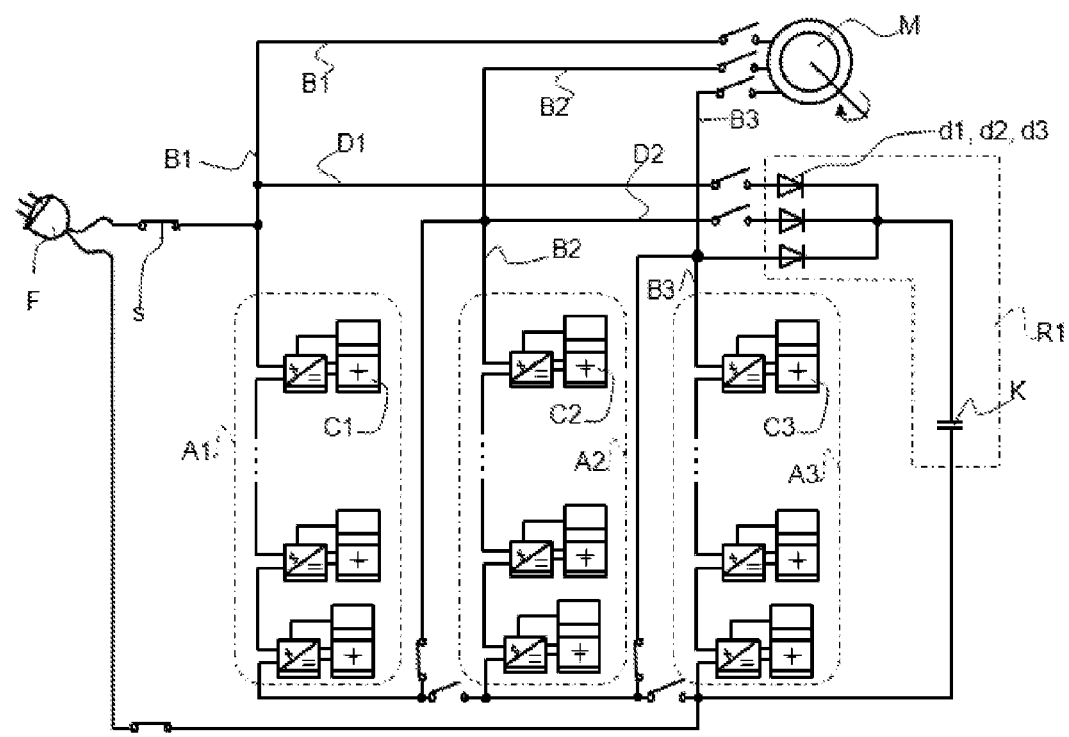

[Fig.6]
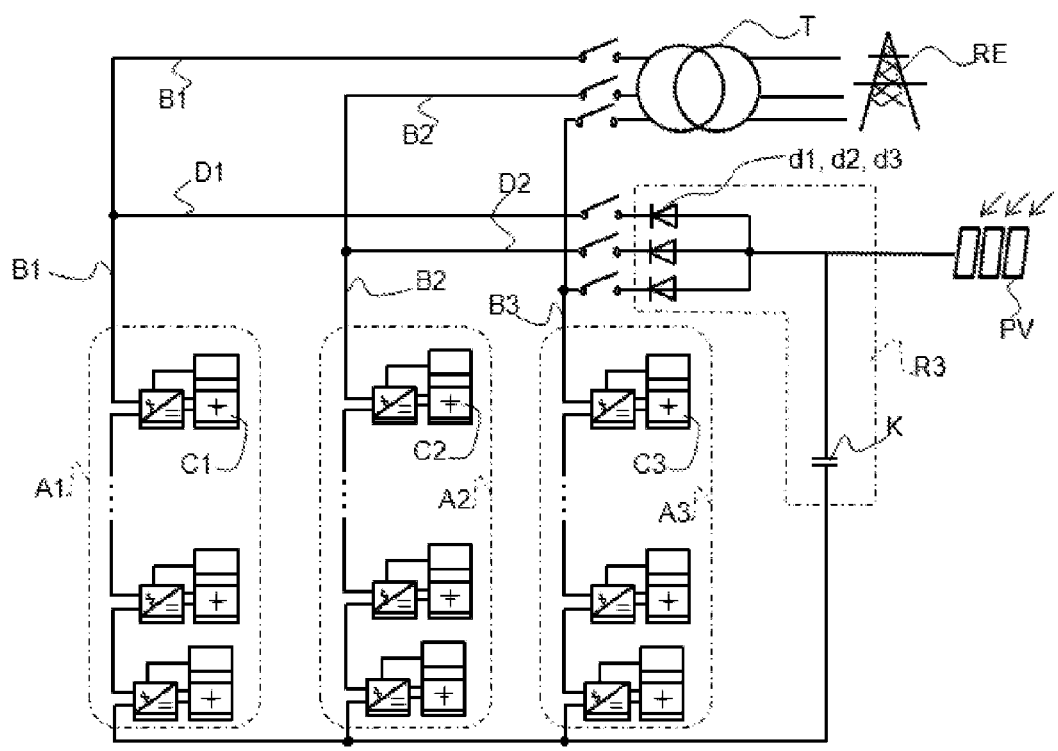

DEVICE FOR CREATING A DC VOLTAGE BUS FOR A POLYPHASE ELECTRICAL SYSTEM, MOTOR VEHICLE AND RENEWABLE ENERGY GENERATOR COMPRISING SUCH A DEVICE

CROSS-REFERENCE TO RELATED APPLICATIONS

The present application is the US National Stage under 35 USC § 371 of International Application No. PCT/FR2022/050474, filed Mar. 16, 2022, which claims the priority of French application 2103578 filed on Apr. 8, 2021, the content (text, drawings and claims) of both said applications being incorporated by reference herein.

BACKGROUND

The methods and devices described herein relate to the field of polyphase electrical systems, in particular three-phase electrical systems, such as motor vehicle or renewable energy generator systems. More particularly, devices for generating a DC voltage for such electrical systems are described.

In this field, the conventional electrical architectures of electric vehicles (of the BEV type) integrate a set of electronic power devices making it possible to adapt the DC current/voltage pair delivered by the battery on the one hand to the electrical power units of the vehicle, generally at 450 V in direct current and in three-phase mode for the powertrain and the connection to the network during recharging operations on an AC network; and on the other hand to an on-board network (generally 12V). In the case of plug-in hybrid vehicles (PHEV type), all of the components, in particular DC-to-DC converters, inverters and chargers are also present and cohabit with an internal-combustion powertrain.

In this type of architecture, all Li-ion cells are covered by the current drawn by the various consumers (electric machine, air conditioning compressor, PTC heater and on-board network, etc.). The battery output voltage varies in order of magnitude from 270V to 450V DC. Although this architecture is most commonly implemented, it may be criticized for its assembly complexity, its volume and its efficiency.

In response to these drawbacks, the applicant has proposed a breakthrough powertrain architecture where each Li-ion or cluster cell of a few cells is controlled individually to produce, at the battery output, a three-phase voltage as well as a direct voltage. In this configuration, the battery directly produces the three-phase voltage, an adjustable DC voltage (high voltage) via a group of cells or clusters, as well as a voltage (low voltage), for example at 12V, to supply the on-board network and recharge the lead battery.

This architecture has, in line with each cell or cluster of cells, a DC-to-AC converter (comprising an H-bridge) associated with a DC-to-DC converter.

Although this architecture is very attractive (in particular in terms of the efficiency of the powertrain, of the availability of the battery by giving the possibility of branching a cell or cluster, etc.) its implementation complexity seems unacceptable for industrial application, in particular due to the presence of numerous DC-to-DC converters in line with each cell or cluster.

Solutions are therefore sought that make it possible to limit the complexity of implementing this architecture while maintaining all the advantages.

SUMMARY

Thus, an objective is to generate a DC voltage by forming a constant or adjustable DC voltage bus in an electric vehicle powertrain generating a three-phase current wave to supply the electric traction machine, so as to supply a direct current on-board network.

To achieve this objective, a device is related forming a DC voltage bus for a polyphase electrical system, comprising several voltage legs, each comprising a plurality of battery cell modules, each module comprising a battery cell or a cluster of battery cells, connected to a DC-to-AC converter comprising an H-bridge;
  said battery cell modules being connected together in series via the DC-to-AC converter;
  said voltage legs each being connected to a specific phase leg for said polyphase electrical system,
  at least one phase leg having a branch connected to a rectifier module.

Advantageously, the device comprises control means capable of controlling the converters so as to generate at the output of each voltage leg a voltage corresponding to the sum of a reference voltage required for the operation of the polyphase electrical system and of an identical common mode voltage for each leg, the temporal superposition of the voltages at the output of each voltage leg forming a voltage plateau extracted by the rectifier module in order to obtain the DC voltage.

The set of DC-to-AC converters (each comprising the H-bridge) in line with each cell makes it possible to generate a three-phase current wave to supply an electric traction machine.

Furthermore, the device makes it possible to eliminate DC-to-DC converters internal to the battery by adding identical voltage components to the waveforms generated by the traction inverter so as to create a constant DC bus adjustable in amplitude.

According to other aspects considered separately, or combined according to all technically feasible combinations:
  the device comprises three voltage legs connected to three phase legs each comprising a specific branch connected to said rectifier module; and/or
  said rectifier module comprises a branch diode; and/or
  said rectifier module is bidirectional; and/or
  the common mode voltage, Vmc, is defined by the relationship:

$$V_{MC}=V_{dc}-\max(V_{ref1},\ldots,V_{refN})$$

where Vdc is the DC voltage, and Vref1, ..., VrefN are the reference voltages required for the operation of a polyphase electrical system with N phases.
  the device forming the DC voltage bus comprises a module for connecting a battery charge to a high-voltage DC voltage network associated with the voltage legs.

Further related is a polyphase electrical system for a motor vehicle, comprising a device forming a DC voltage bus, characterized in that the phase legs are connected to the traction motor of the motor vehicle, and the branches are connected to at least one electrical device of the vehicle.

Another object relates to a motor vehicle comprising a polyphase electrical system.

Further related is a polyphase electrical system for a renewable energy generator, comprising a device forming a DC voltage bus, characterized in that the phase legs are connected to an electrical network, and the branches are connected to a renewable energy generator.

Further related is a renewable energy generator system comprising a polyphase electrical system.

Further related is a method for generating polyphase electrical current comprising steps for
- connecting battery cell modules together in series via a DC-to-AC converter comprising an H-bridge to form voltage legs each comprising a plurality of battery cell modules;
- connecting each of said voltage legs to a specific phase leg to form a polyphase electrical system so as to generate and use a polyphase alternating current;
- connecting at least one branch of at least one phase leg to a rectifier module so as to use a direct current.

BRIEF DESCRIPTION OF THE FIGURES

The described methods and devices will be further detailed by the description of non-limiting embodiments, and based on the appended figures illustrating variants, wherein:

FIG. 1 schematically shows a battery cell module of a device according to a preferred variant.

FIG. 2 schematically shows a device forming a DC voltage bus according to a first preferred embodiment.

FIG. 3 schematically shows the voltages delivered by the voltage legs constituting the phases of the polyphase system with a device according to the first embodiment.

FIG. 4 schematically illustrates a bidirectional rectifier module for a device forming a DC voltage bus according to a second embodiment.

FIG. 5 schematically shows a device forming a DC voltage bus according to a third preferred embodiment.

FIG. 6 schematically shows a device forming a DC voltage bus according to a third preferred embodiment.

DETAILED DESCRIPTION

Described herein is a device forming a DC voltage bus for a polyphase electrical system. Such a polyphase electrical system, in particular three-phase, may be an electrical system for a motor vehicle traction machine M, or an electrical system connected to the electrical grid and to a renewable energy generator PV.

The device forming a DC voltage bus comprises voltage legs A1, A2, A3 making it possible to produce a polyphase voltage system, in particular three voltage legs. Each voltage leg A1, A2, A3 comprises a plurality of battery cell modules C1, C2, C3. Each battery cell module comprises a battery cell or a cluster of battery cells c1. The battery cells are connected to a DC-to-AC converter.

In particular, in a battery cell module C1, C2, C3, the cells c1 are connected to a DC-to-AC converter which mainly comprises, or preferably consists of, an H-bridge mount (H). The cells c1 are further connected to a means of supervision BMS and/or control means Ct of the H-bridge and/or to a cell diagnostic means. The preferred battery cell module can be illustrated by FIG. 1. In the preferred variant, battery cells c1 are connected to a battery management system BMS of the module, configured to supervise the cell(s), perform diagnostics and control the H-bridge. The details of such an assembly can be that described in FIG. 1.

The battery cell modules are connected together in series via the DC-to-AC converter, so as to form each of said voltage legs A1, A2, A3. Control means, not shown, are provided to control all the converters so as to obtain the desired voltage at the terminals of each voltage leg A1, A2, A3.

The set of voltage legs, A1, A2, A3 forms a multi-level inverter integrated into the battery.

Each voltage leg A1, A2, A3 is connected to a specific phase leg B1, B2, B3 for said polyphase electrical system. Furthermore, at least one phase leg, preferably the three phase legs B1, B2, B3 comprise a corresponding branch D1, D2, D3 connected to a rectifier module R1.

Advantageously, the DC-to-AC converter, more particularly the H-bridge in line with each cell c1, makes it possible, by connecting in series with the other DC-to-AC converters of the same voltage leg, to generate a three-phase current wave to supply an electric traction machine M.

Furthermore, the device makes it possible to eliminate DC-to-DC converters internal to the battery by adding to the reference polyphase voltages to be applied to the windings of the machine M, a set of identical voltages calculated to make it possible to form a constant DC voltage bus adjustable in amplitude.

The described devices make it possible to use a polyphase alternating current, in particular to power the motor M at high voltage, and at the same time to use the particular voltage waveforms generated and applied to the terminals of the rectifier R1 to form an adjustable DC voltage bus, in particular at high or low voltage, or even at very low voltage.

More specifically, the described devices make it possible to create a DC voltage bus for the on-board network of a vehicle from the supply voltages of the traction machine; generate a constant or adjustable DC bus from voltages of variable amplitude and frequency generated by the traction inverter of the vehicle; and (in another embodiment) to generate an adjustable DC bus from alternating voltages imposed by the electrical network connected to PV panels for example.

In particular, the device forming a bus comprises three branches D1, D2, D3, coming from said three specific phase legs B1, B2, B3. The three branches D1, D2, D3 are started from their respective phase leg B1, B2, B3 from a tap P1, P2, P3 on their respective phase leg B1, B2, B3. Said branches D1, D2, D3 are connected together at the output, Sr, of said rectifier module R1.

In a first embodiment, said rectifier module R1 comprises one diode d1, d2, d3 per leg D1, D2, D3. This embodiment can be illustrated by FIG. 2.

Advantageously, this embodiment involves a simplified rectifier module R1 having usual components, which are easy to obtain and mount. Furthermore, the diodes are components that are particularly reliable and robust.

Furthermore, the DC-to-DC converter of the devices of the prior art disappears and its functionality is replaced by a set of three diodes separately connected to each of the phases of the electrical machine M. The association of a specific control law in the generation of the voltage waveforms applied to the electrical machine M makes it possible to produce a DC voltage of controlled amplitude that is also adjustable.

In this configuration, the energy transfer is only possible from the battery to the DC network and the system remains operational in the various operating situations of the system, namely operating in traction mode, regenerative braking, battery recharging with AC single-phase, three-phase, and direct current.

It is sufficient for the voltages to be present on the legs of the device so that it generates a DC voltage.

The elimination of the intermediate components of the prior art simplifies both the system and the assembly thereof, as well as ensuring better energy efficiency.

The first embodiment is suitable for use in an electric vehicle in a traction or charging mode of a vehicle, that is to say with discharge or recharging of the battery and regenerative braking.

For example, in traction mode, the principle is as follows:

At the reference voltages Vref1, Vref2, Vref3, required for the operation of the polyphase electrical system, in this case the electrical machine M, one and the same common mode voltage is added $V_{MC}$, such that the voltages at the terminals of the voltage legs A1, A2, A3 correspond to Vond1, Vond2, Vond3, namely:

$$V_{ond1} = V_{ref1} + V_{MC}$$

$$V_{ond2} = V_{ref2} + V_{MC}$$

$$V_{ond3} = V_{ref3} + V_{MC}$$

The voltages here are to be understood as instantaneous voltages, changing over time.

The voltages between phases and neutral of the multilevel inverter are collected by virtue of the three diodes d1, d2, d3. The DC voltage Vdc collected is then:

$$V_{dc} = \max(V_{ond1}, V_{ond2}, V_{ond3}) = V_{MC} + \max(V_{ref1}, V_{ref2}, V_{ref3})$$

To generate a DC voltage Vdc defined on the DC bus, it is therefore necessary to add to the reference voltages Vref1, Vref2, Vref3 required for the operation of the polyphase electrical system, in this example the electric motor, the common mode voltage, $V_{MC}$, as follows:

$$V_{MC} = V_{dc} - \max(V_{ref1}, V_{ref2}, V_{ref3})$$

The example is given here for three phases, however if the polyphase system comprises N legs the expression of the common mode voltage, V Mc, becomes:

$$V_{MC} = V_{dc} - \max(V_{ref1}, \ldots, V_{refN})$$

The control means are therefore provided to control the converters so as to generate at the output of each voltage leg A1, A2, A3 the voltage Vond1, Vond2, Vond3 corresponding to the sum of the reference voltage Vref1, Vref2, Vref3 required for the operation of the polyphase electrical system, in this example the electric machine, and of the common mode voltage Vmc, identical for each voltage leg A1, A2, A3, so that the temporal superposition of these voltages Vond1, Vond2, Vond3 forms a voltage plateau. It is this voltage plateau which, extracted by the rectifier module, makes it possible to obtain the DC voltage Vdc.

The phase-to-phase voltages at the terminals of the phases of the machine, $U_{12}, U_{23}, U_{31}$, are then:

$$U_{12} = V_{ond1} - V_{ond2} = V_{ref1} + V_{MC} - V_{ref2} - V_{MC} = V_{ref1} - V_{ref2}$$

$$U_{23} = V_{ond2} - V_{ond3} = V_{ref2} - V_{ref3}$$

$$U_{31} = V_{ond3} - V_{ond1} = V_{ref3} - V_{ref1}$$

It can therefore be noted that the common mode voltage, $V_{MC}$, is advantageously eliminated in the expression of the compound voltages applied to the machine M. In the case of sinusoidal reference waveforms Vref1, Vref2, Vref3, the machine M is supplied by sinusoidal voltages whether it is connected in a delta or wye mode.

The common mode voltage, $V_{MC}$, is therefore a degree of freedom to adjust the value of the voltage of the DC bus without impacting the waveforms applied to the electrical machine.

FIG. 3 shows the voltages Vond1, Vond2, Vond3 of the three arms A1, A2, A3 corresponding to the sum of a voltage form identical to the three arms A1, A2, A3, this identical voltage form being called common mode Vmc, with respectively the reference voltages Vref1, Vref2, Vref3. The sum of these voltages is that which is desired to be applied to the machine M.

The three-phase voltages obtained have a repetitive, but non-sinusoidal, characteristic form. It will be noted in the Figure that the temporal superposition of these voltage shapes Vond1, Vond2, Vond3 then shows a plateau p of maximum voltage. This plateau p is used to manufacture a DC voltage bus. The rectifier module R1 makes it possible to draw a DC voltage component which can be used for the on-board network.

A wye or delta mode of connection of the windings of the machine M enables the natural elimination of the identical voltage form added to each of the references of the voltages of the legs A1, A2, A3 and the voltages at the terminals of the windings of the machine M have the perfect sinusoidal wave form sought. The operation of the electrical machine M is therefore normal.

Another benefit lies in the control mode making it possible to generate the common mode voltage Vmc (that is, the identical voltage form added to the voltage reference of each phase of the machine) required to obtain the voltage level over the DC network. This particular control mode allows the circulation of a significant fluctuating power circulating in all the cells of the various arms A1, A2, A3. The management of this power in each battery cell can be used to manage the balancing of the load levels of the cells by allowing, in particular, power transfers from one voltage leg A1, A2, A3 to the other via the currents in the traction machine M.

The use of diodes involves a unidirectional direction given by the diodes ($V_{DC}$ voltage). Thus, a second embodiment is based on a rectifier module R2 that is bidirectional.

To ensure the bidirectionality of the DC bus, the rectifier module is modified by using, in a variant, a switching structure of the PWM type associated with a bridge arm for managing the potential of the neutral (common mode voltage). FIG. 4 shows an example of a PWM structure compatible with this operating mode.

Despite its complexity, this structure makes it possible on the one hand to ensure the bidirectionality of the DC bus, but also on the other hand to finely control the power sampling in common mode and in differential mode while allowing the adjustment of the DC voltage to the desired value.

There is then nothing to prevent the use of the device forming a DC bus from powering another converter and another traction machine to ensure the operation of a vehicle in four wheel drive mode.

Other bidirectional rectifier modules can be envisaged, in particular those known to the person skilled in the art.

The described devices can be adapted to battery charging systems. Thus, in a third embodiment, the device forming a bus comprises a battery charge connection module (socket F) associated with the voltage legs A1, A2, A3.

The third embodiment is suitable for use in an electric vehicle (of the rechargeable type) in a fast-charging mode (high-voltage DC) for a plug-in vehicle battery. The socket F is connected to the electrical grid via a load terminal delivering a DC voltage (for example, 350A-1000V in maximum values).

In particular, switches are provided to allow the serial connection of the voltage legs, the disconnecting of the two diodes connected to the voltage legs at the highest potentials, and the disconnecting of the traction machine M.

Further related is a polyphase electrical system comprising a device forming a DC voltage bus as described above. Depending on the embodiment considered, the electrical system may be a system for an electric vehicle traction motor, for example of the PHEV, BEV, etc. type; or an electrical system for a renewable energy generator connected to an electrical grid RE via battery cells c1.

The first embodiment relates to a polyphase electrical system for a motor vehicle. This system comprises the device forming a DC voltage bus as described above as well as a traction motor M connected to the device forming the bus. Furthermore, the branches D1, D2, D3 are connected to at least one electrical device of the vehicle, more particularly to the on-board network of the vehicle. The details of the system have already been described above. It may be illustrated by FIG. 2.

The second embodiment relates to a polyphase electrical system for a motor vehicle, including a bidirectional rectifier module. Likewise, this system comprises the device forming the DC voltage bus as described above, similar to that of the first embodiment with a difference at the rectifier module that can for example be of the PWM type and bidirectional with respect to energy transfer (illustrated by FIG. 4).

The third embodiment relates to a polyphase electrical system for a motor vehicle, including a connection module enabling the fast recharging of the battery on a high-voltage DC charging terminal. Likewise, this system comprises the device forming the DC voltage bus as described above, similar to that of the first embodiment with a difference at the socket F and the switches s. It may be illustrated by FIG. 5.

Further related is a motor vehicle comprising a polyphase electrical system as described above.

The fourth embodiment relates to a polyphase electrical system for a renewable energy generator. "Renewable energy generator" is understood to mean a device that converts mechanical or solar energy into electrical energy. They are, for example, PV panels, wind turbines, hydroelectric systems or other dynamo-electric systems.

In this system, the phase legs B1, B2, B3 are connected to an electrical grid, and the branches D1, D2, D3 are connected to a renewable energy generator PV. Furthermore, the diodes d1, d2, d3 are reversed.

The MPPT (Maximum Power Point Tracking) control technique is a principle that makes it possible to track the maximum power point of a non-linear electrical generator such as the solar panel. The benefit is to adjust the output voltage of the solar panels to obtain the maximum power for a given current (which depends on the sunshine).

It is possible to connect, via the three diodes d1, d2, d3 (FIG. 6), the solar panels PV directly to the battery and to remove the MPPT controller, the maximum power search function now being directly managed by the battery.

Compared to the electric mobility application (first, second and third embodiments), the stationary firm application (fourth embodiment) leads to reversing the direction of the diodes d1, d2, d3, with the control principle remaining the same.

Advantageously, it is possible to connect photovoltaic panels (or other renewable energy generators) directly to the battery, avoiding the traditional architecture. Likewise, the elimination of the intermediate components simplifies both the system and the assembly thereof, as well as ensuring better efficiency.

A transformer T may be provided between the phase legs B1, B2, B3 and the electrical grid RE.

Further related is a renewable energy generator system comprising a renewable energy generator PV, and a polyphase electrical system as described previously connected to said renewable energy generator PV.

The possible variants comprise all electronic power structures making it possible to use the common mode voltage generated to create auxiliary voltage sources, such as a module including a power factor corrector (PFC) for absorbing currents with controllable forms on the different phases of the battery. The PFC unit would replace the diodes with a more complex structure which associates transistors and inductors.

Other variants relate to a rectifier module including a DC-to-DC converter with or without galvanic isolation. The addition of a DC-to-DC converter makes it possible to produce, for example, 12V or 48V.

Also related is a particular method for generating polyphase electrical current.

The method is preferably based on an architecture as described above.

The method comprises a step for connecting in series battery cell modules C1, C2, C3 via the serial connecting of DC-to-AC converters (DCAC) in an H-bridge. The modules thus connected together form voltage legs A1, A2, A3.

The method further comprises a step for connecting each of said voltage legs A1, A2, A3 to a specific phase leg B1, B2, B3 for a polyphase electrical system M, RE. This step results in generating a polyphase AC voltage system, in particular at the terminals of the voltage legs A1, A2, A3.

The method further comprises a step for connecting at least one branch D1, D2, D3 of at least one phase leg B1, B2, B3 to a rectifier module R1, R2, R3 depending on the case. In particular, the three branches D1, D2, D3 of the three phase legs B1, B2, B3 are connected to said rectifier module. This step results in forming a DC voltage bus, in particular at the terminals of the rectifier module R1, R2 or R3 as the case may be.

In particular, the basic principle consists of causing the conversion structure of the powertrain to generate voltages consisting of the superposition of a differential mode seen by the traction machine M and meeting the vehicle motor's needs (traction/braking); and of an adjustable common mode, naturally removed by the machine M (machine windings connected in wye or delta). The voltages of the inverter comprising the common mode and the differential mode are generated between the outputs of the phase legs of the inverter connected in wye mode and the neutral point of this structure. This common mode voltage is used to generate a DC on-board network.

The invention claimed is:

1. A device forming a DC voltage bus for a polyphase electrical system comprising voltage legs, each comprising a plurality of battery cell modules, each module comprising a battery cell or a cluster of battery cells, connected to a DC-to-AC converter comprising an H-bridge;
    said battery cell modules being connected together in series via the DC-to-AC converter;
    said voltage legs each being connected to a specific phase leg for said polyphase electrical system,
    at least one phase leg comprising a branch connected to a rectifier module, wherein the device comprises control means capable of controlling the converters so as to generate at the output of each voltage leg a voltage corresponding to the sum of a reference voltage required for the operation of the polyphase electrical system and of an identical common mode voltage for each voltage leg, the temporal superposition of the voltages at the output of each voltage leg forming a voltage plateau (p) extracted by the rectifier module to obtain the DC voltage.

2. The device forming a DC voltage bus according to claim 1, comprising three voltage legs connected to three specific phase legs each comprising a specific branch connected to said rectifier module.

3. The device forming a DC voltage bus according to claim 1, wherein said rectifier module comprises one diode per branch.

4. The device forming a DC voltage bus according to claim 1, wherein said rectifier module is bidirectional.

5. The device forming a DC voltage bus according to claim 1, wherein the common mode voltage (Vmc) is defined by the relationship:

$$V_{MC} = V_{dc} - \max(V_{ref1}, \ldots, V_{refN})$$

Where Vdc is the DC voltage, and Vref1, ..., VrefN are the reference voltages required for the operation of a polyphase electrical system with N phases.

6. The device forming a DC voltage bus according to claim 1, comprising a battery charge connection module on a high-voltage DC voltage network associated with the voltage legs.

7. A polyphase electrical system for a motor vehicle, comprising a device forming a DC voltage bus according to claim 1, wherein the phase legs are connected to a traction motor of the motor vehicle, and the branches are connected to at least one electrical device of the vehicle.

8. A motor vehicle comprising a polyphase electrical system according to claim 7.

9. A polyphase electrical system for a renewable energy generator, comprising a device forming a DC voltage bus according to claim 1, wherein the phase legs are connected to an electrical grid, and the branches are connected to a renewable energy generator.

10. A renewable energy generator system comprising a polyphase electrical system according to claim 9.

11. A method for generating polyphase electric current comprising steps for
connecting battery cell modules together in series via a DC-to-AC converter comprising an H-bridge to form voltage legs each comprising a plurality of battery cell modules;
connecting each of said voltage legs to a specific phase leg to form a polyphase electrical system so as to generate and use a polyphase alternating current;
connecting at least one branch of at least one phase leg to a rectifier module;
generating at the output of each voltage leg a voltage corresponding to the sum of a reference voltage required for the operation of the polyphase electrical system and of an identical common mode voltage for each voltage leg, the temporal superposition of the voltages at the output of each voltage leg forming a voltage plateau (p) extracted by the rectifier module to obtain the DC voltage.

* * * * *